US010844284B2

(12) United States Patent
Lopez Fresno et al.

(10) Patent No.: US 10,844,284 B2
(45) Date of Patent: Nov. 24, 2020

(54) METHOD FOR OBTAINING A HEIGHT OF A MATERIAL STACKED IN A COKE OVEN (71) Applicant: ARCELORMITTAL, Luxembourg (LU)

(72) Inventors: José Lopez Fresno, Aviles (ES); José Luis Garcia Cimadevilla, Aviles (ES); Juan José Fernandez Lopez, Aviles (ES)

(73) Assignee: ARCELORMITTAL, Luxembourg (LU)

(*) Notice: Subject to any disclaimer, the term of this patent is extended or adjusted under 35 U.S.C. 154(b) by 86 days.

(21) Appl. No.: 16/099,820

(22) PCT Filed: May 9, 2017

(86) PCT No.: PCT/IB2017/052679
§ 371 (c)(1),
(2) Date: Nov. 8, 2018

(87) PCT Pub. No.: WO2017/195098
PCT Pub. Date: Nov. 16, 2017

(65) Prior Publication Data
US 2020/0181496 A1 Jun. 11, 2020

(30) Foreign Application Priority Data

May 13, 2016 (WO) .................. PCT/IB2016/052783

(51) Int. Cl.
C10B 41/00 (2006.01)
C10B 37/02 (2006.01)
(Continued)

(52) U.S. Cl.
CPC ............ *C10B 41/005* (2013.01); *C10B 37/02* (2013.01); *G01B 7/023* (2013.01); *G01B 7/082* (2013.01); *G01K 7/02* (2013.01); *G01K 13/00* (2013.01)

(58) Field of Classification Search
CPC ....... C10B 41/005; C10B 37/02; G01B 7/023; G01B 7/082; G01K 7/02; G01K 13/00
See application file for complete search history.

(56) References Cited

U.S. PATENT DOCUMENTS 4,375,388 A * 3/1983 Hara .................. C10B 37/04
202/239
4,814,691 A * 3/1989 Garbini .................. G01B 7/12
324/661
(Continued)

FOREIGN PATENT DOCUMENTS

CN 1070731 A 4/1993
CN 1828236 A 9/2006
(Continued)

OTHER PUBLICATIONS

International Search Report issued in connection with International Application No. PCT/IB2017/052679, dated Dec. 7, 2017.
(Continued)

*Primary Examiner* — Jonathan Miller
(74) *Attorney, Agent, or Firm* — Davidson, Davidson & Kappel, LLC (57) ABSTRACT A method for obtaining a parameter representative of a height (H) of an upper surface of a material stacked in a coke oven with respect to a reference plane (P) is provided. The method includes the following steps:
providing a sensor located above the upper surface at an operation distance (D1) from the reference plane, the sensor and the material forming a capacitor having a capacitance,
(Continued)

obtaining at least one capacitance signal representative of said capacitance, obtaining at least one distance signal (S2) using the capacitance signal, the distance signal being representative of a distance (D2) between the sensor and the upper surface along a vertical direction (Z), and obtaining said parameter representative of the height using the distance signal and the operation distance. A process for controlling a filling rate of the coke oven, a system for implementing the method, and a coke oven including the system are also provided.

15 Claims, 5 Drawing Sheets

(51) Int. Cl.
*G01B 7/02* (2006.01)
*G01B 7/06* (2006.01)
*G01K 7/02* (2006.01)
*G01K 13/00* (2006.01)

(56) References Cited

U.S. PATENT DOCUMENTS

| | | | |
|---|---|---|---|
| 8,568,568 B2 * | 10/2013 | Schuecker | C10B 37/02 201/1 |
| 9,638,516 B2 * | 5/2017 | Yamahira | G01B 11/2518 |

| | | | |
|---|---|---|---|
| 2001/0024126 A1 | 9/2001 | Sport et al. | |
| 2007/0222462 A1 | 9/2007 | Gardner et al. | |
| 2010/0276269 A1 | 11/2010 | Schuecker et al. | |
| 2010/0313654 A1 | 12/2010 | Malinovskiy et al. | |
| 2011/0089956 A1 | 4/2011 | Hermann et al. | |
| 2011/0272865 A1 | 11/2011 | Shameli et al. | |

FOREIGN PATENT DOCUMENTS

| | | | | |
|---|---|---|---|---|
| CN | 1918485 A | 2/2007 | | |
| CN | 101410690 A | 4/2009 | | |
| CN | 101896797 A | 11/2010 | | |
| CN | 102589644 A | 7/2012 | | |
| CN | 102884388 A | 1/2013 | | |
| CN | 203216570 U | 9/2013 | | |
| CN | 103604359 A | 2/2014 | | |
| CN | 105136007 A | 12/2015 | | |
| CN | 105157774 A | 12/2015 | | |
| DE | 1020057172 A | 8/2006 | | |
| DE | 102005007164 A | 8/2006 | | |
| DE | 102006008150 A1 | 8/2007 | | |
| DE | 102006008150 A1 * | 8/2007 | | C10B 41/005 |
| JP | 2005272549 A * | 10/2005 | | C10B 41/005 |
| JP | 2005306976 A | 11/2005 | | |
| JP | 2015081258 A | 4/2015 | | |
| KR | 20080099699 A | 11/2008 | | |

OTHER PUBLICATIONS

International Search Report issued in connection with International Application No. PCT/IB2016/052783, dated Feb. 16, 2017.

* cited by examiner

METHOD FOR OBTAINING A HEIGHT OF A MATERIAL STACKED IN A COKE OVEN

The present invention relates to a method for obtaining a parameter representative of a height of an upper surface of a material stacked in a coke oven with respect to a reference plane. Such a method deals in particular with bulk coal or coke level measurement.

The invention also relates to a process for controlling a filling rate of the coke oven, and to a system for implementing the method, and a coke oven including the system.

BACKGROUND OF THE INVENTION

The chamber of a coke oven is filled with coal generally through filling holes, which tends to form cones of bulk coal under the holes. In order to push the bulk coal in the chamber and level it, a levelling bar is introduced in the chamber and moved along a longitudinal direction with respect to the coke oven.

DE-A-10 2005 007164 describes a method for leveling cones of coal in coke oven using a horizontal levelling plate which slides into the oven. A sensor is mounted on its front edge to detect contact with the cones. For productivity reasons, it is important to make sure that the oven is sufficiently filled, by assessing a level of filling of the oven. It is also important to detect whether an oven is sufficiently filled, as charging an oven which is already filled may trigger the formation of dust that is harmful to the environment.

The level of bulk coal or coke is measured through the holes using methods known for resisting the high temperatures and the amount of dust in the coke oven. For example, mechanical or radar sensors able to detect the coal surface have been used through the filling holes.

For example KR-A-2008099699 discloses a method for measuring a coal filling level using a laser sensor mounted on a support base connected to a filling car.

JP-A-2005306976 describes a coal filling level using a microwave level meter in the upper part of a coal supply hopper.

DE-A-10 2005 007172 also discloses a contactless method involving laser, radar or ultrasonic devices.

However, this way of controlling the bulk coal or coke level is not entirely satisfactory, because it takes time and the filling holes must remain open during the measurement. As a result, a risk is created for workers performing the measurements or working around the coke oven. Also, the number of coke ovens which can be measured daily and the accuracy of the level control are limited, which negatively impacts productivity. In addition, these measurements are local and limited to an area close to the charging holes, so that the bulk coal or coke height in the rest of the oven remains unknown, for example between the charging holes and at the entrance/exit of the coke oven.

US-A-2010/276269 discloses a method for measuring a 3D profile of coal in a coke oven, using a contactless sensor in a levelling rod. The sensor may be based on laser beams, microwaves and/or ultrasound. However, this device does not work properly in environments with a lot of dust or fumes, such as during coal charging, and it requires regular maintenance or cleaning to provide accurate measurements.

Such methods provide signals that are not always very stable. They may also prove costly, due to maintenance or protection of equipment in a very aggressive environment with high temperatures and dust.

An object of the invention is to provide a method that would in particular allow fast and accurate determination of a level of bulk coal or coke in an oven, independently of the environment conditions. A further object of the invention is to improve the oven productivity, while reducing its environmental impact and increasing the workers' safety.

BRIEF SUMMARY OF THE INVENTION

The invention provides a method for obtaining a parameter representative of a height of an upper surface of a material stacked in a coke oven with respect to a reference plane, comprising the following steps:
 providing a sensor located above the upper surface at an operation distance from the reference plane, the sensor and the material forming a capacitor having a capacitance,
 obtaining at least one capacitance signal representative of said capacitance,
 obtaining at least one distance signal using the capacitance signal, the distance signal being representative of a distance between the sensor and the upper surface along a vertical direction, and
 obtaining said parameter representative of the height using the distance signal and the operation distance.

In certain embodiments, the method comprises one or several of the following feature(s), taken in isolation or any technical feasible combination:
 measuring a parameter representative of a temperature of the sensor, and correcting the capacitance signal provided by the sensor in function of said parameter in order to produce the distance signal;
 obtaining the capacitance signal comprising selecting the operation distance so that the distance between the sensor and the upper surface ranges is between 0 cm and 60 cm;
 moving the sensor within the coke oven in a plurality of successive locations with respect to the upper surface, obtaining a plurality of distance signals, each of the distance signals being obtained in one of the successive locations, and obtaining a profile of the upper surface using the plurality of distance signals; and
 a step of calculating a filling rate of the coke oven using the obtained profile, wherein the filling rate is representative of an amount of the material in the coke oven.

The invention also provides a process for controlling a filling rate of a coke oven, the process comprising:
 implementing a method as described above in order to obtain the filling rate of the coke oven, and
 adjusting the amount of the material in the coke oven using the obtained filling rate.

The invention also provides a system for obtaining a parameter representative of a height of an upper surface of bulk coal stacked in a coke oven with respect to a reference plane, comprising:
 a leveling bar intended to be moved within the coke oven in a plurality of successive locations with respect to the upper surface, and
 at least one assembly fastened to the leveling bar and including:
  a sensor intended to be above the upper surface at an operation distance from the reference plane and to form a capacitor with the material, the capacitor having a capacitance, and
  a device for providing at least one capacitance signal representative of said capacitance, and
 a calculator,
 the assembly being suitable for providing at least one distance signal using the capacitance signal, the distance signal being representative of a distance between the sensor and the upper surface along a vertical direction, the calculator being adapted to calculate said parameter using the distance signal and the operation distance.

In certain embodiments, the system comprises one or several of the following feature(s), taken in isolation or any technical feasible combination:

- the leveling bar has a bottom part, and the sensor is located vertically at a distance above the bottom part, said distance ranging between 100 mm and 350 mm, preferably between 100 mm and 150 mm;
- the assembly further comprises a protective housing hosting the sensor, the protective housing being suitable for providing thermal insulation from a temperature comprised between 1000° C. and 1100° C. within the coke oven;
- the protective housing comprises a case and at least one plate made of a dielectric material;
- the plate is at least 20 mm thick;
- all electronic components of the assembly are located within the protective housing and are powered with a rechargeable battery also located within the protective housing;
- the sensor comprises one or two metal plates;
- the assembly further includes a temperature sensor adapted to measure a temperature in the assembly, and a temperature compensation system adapted to correct the capacitance signal provided by the sensor for variations of the measured temperature in order to produce the distance signal;
- the assembly further includes an accelerometer adapted to provide parameters for inertial navigation of the assembly;
- the assembly further comprises a wireless signals emitter adapted to emit the distance signal; and
- the device further comprises a wireless signals receiver adapted to receive the distance signal emitted by the emitter.

The invention also provides a system for obtaining a parameter representative of a height of an upper surface of coke stacked in a coke oven with respect to a reference plane, comprising:

- a guide car intended to be moved within the coke oven in a plurality of successive locations with respect to the upper surface, and
- at least one assembly fastened to the guide car and including:
  - a sensor intended to be above the upper surface at an operation distance from the reference plane and to form a capacitor with the coke, the capacitor having a capacitance, and
  - a device for providing at least one capacitance signal representative of said capacitance, and
- a calculator,
- the assembly being suitable for providing at least one distance signal (S2) using the capacitance signal, the distance signal being representative of a distance between the sensor and the upper surface along a vertical direction,
- the calculator being adapted to calculate said parameter using the distance signal and the operation distance.

The invention also provides a coke oven comprising a system as described above.

BRIEF DESCRIPTION OF THE SEVERAL VIEWS OF THE DRAWING(S)

Other features and advantages of the invention will appear upon reading the following description, given by way of example and with reference to the accompanying drawings, in which.

DETAILED DESCRIPTION OF THE INVENTION

Figure 1:
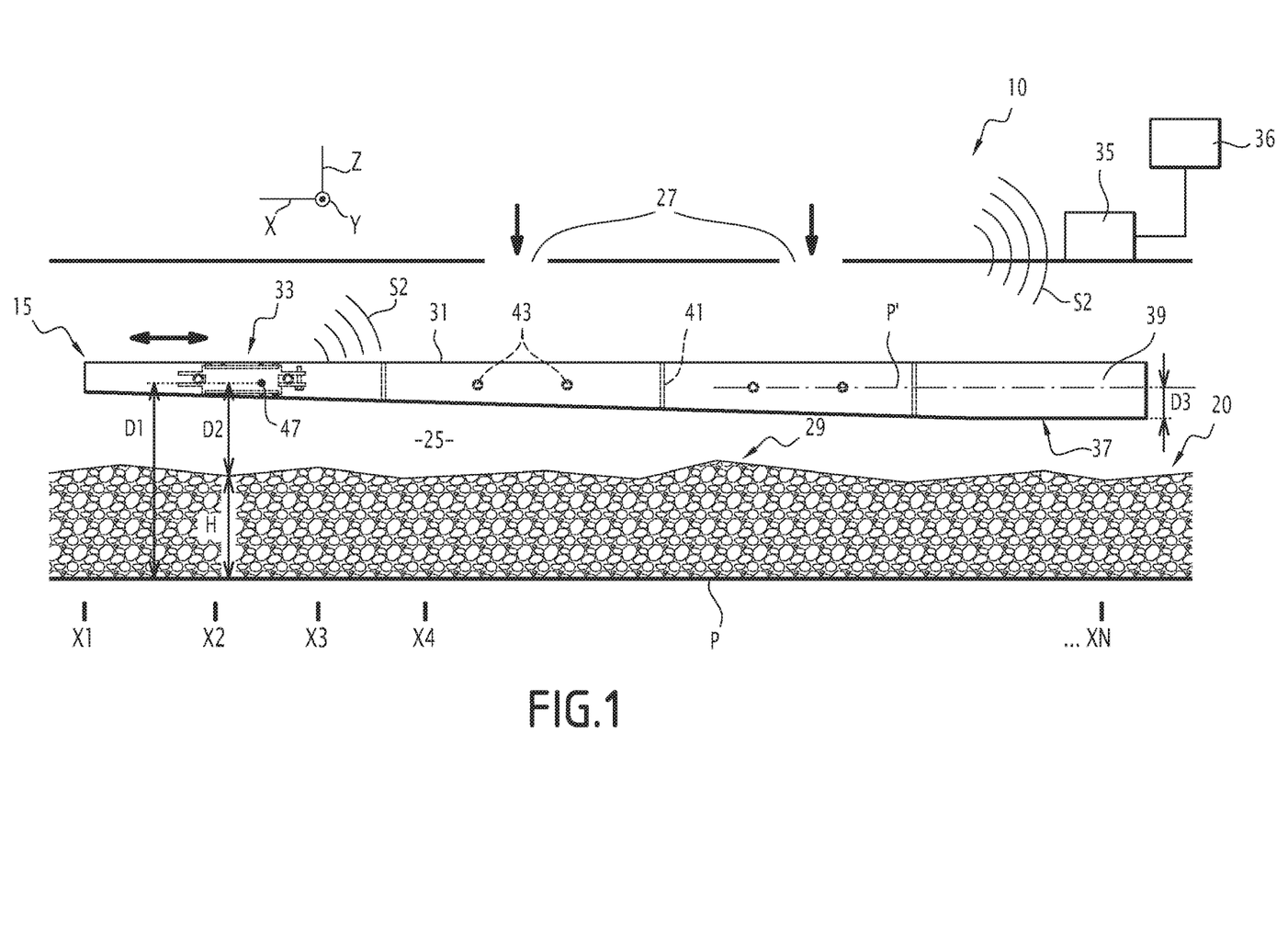
FIG. 1 is a schematic view of the inside of a coke oven according to the invention.

FIG. 1 represents a coke oven 10 according to the invention equipped with a system 15. The coke oven 10 is designed to produce coke (not represented) starting from a material 20 stacked in the coke oven. The material 20 is for example bulk coal.

As a variant, the bulk coal has already been transformed into coke by the coke oven 10 and the material 20 is coke.

The coke oven 10 without the system 15 is known in itself. The coke oven 10 has a chamber 25 extending along a longitudinal direction X which is horizontal in the shown example.

The chamber 25 contains the material 20 and for examples has several filling holes 27 for introducing the bulk coal for example along a vertical direction Z.

A transverse direction Y is also defined, the directions X, Y, Z forming an orthogonal coordinate system.

The material 20 defines an upper surface 29, with a height H along the vertical direction Z with respect to a reference plane P, for example the bottom of the coke oven 10. In general, the height H varies along the longitudinal direction X, thus defining a profile along the direction X.

As shown in FIG. 1, the system 15 comprises a support 31, for example a levelling bar of the coke oven.

A process according to the invention will now be described.

An objective of the process is to control a filling rate of the coke oven 10.

The coke oven 10 is charged with the material 20 through the filling holes 27. The levelling bar is then moved longitudinally in order to make the upper surface 29 more even.

A method according to the invention is performed at a plurality of locations X1, X2 . . . XN along the longitudinal direction X in order to obtain the height H at these locations, that is to say a filling profile of the material 20.

A filling rate of the coke oven 10 is advantageously calculated using the obtained profile and using a width of the coke oven 10 along the transverse direction Y.

In a preferred embodiment, the obtained profile and/or the filling rate are transmitted to an operator or a computer 36 which compares it/them with an optimal charging profile or a target filling rate, and takes action to adapt the profile of the material 20 in the coke oven 10. For example, more of the material 20 is filled through one or several of the filling holes 27, and/or the levelling bar is moved again to flatten the profile.

As a variant, the computer 26 may be replaced by a calculator.

In order to perform the method at the locations X1, X2 . . . XN, a sensor 47 is provided above the upper surface 29 of the material 20 at an operation distance D1 from the reference plane P and successively moved along the longitudinal direction X. The sensor 47 is advantageously carried by the support 31.

As a variant (not shown), a plurality of sensors is provided, each of them being at one of the locations.

In another variant (not shown), several sensors are provided and moved longitudinally and/or transversely with respect to the upper surface 29. By doing so, the precision of how the upper surface 29 is mapped can be adjusted.

The sensor 47 and the material 20 form a capacitor having a capacitance C, as explained later.

A capacitance signal S1 representative of the capacitance C is advantageously obtained from a device 48 electrically connected to the sensor 47.

A distance signal S2 is then produced using the capacitance signal S1, the distance signal S2 being representative of a distance D2 between the sensor 47 and the upper surface 29 along the vertical direction Z. Advantageously, the distance signal S2 directly provides a value of the distance D2.

Finally the height H at each location is obtained using the distance signal S2 and the operation distance D1, based on the fact that the height H equals D1 minus D2.

Optionally a parameter representative of a temperature of the sensor 47 is measured, the capacitance signal S1 is corrected for variations of said parameter in order to produce the distance signal S2.

Advantageously, the capacitance signal S1 is obtained by selecting the operation distance D1 so that the distance D2 remains between 0 cm and 60 cm.

The distance signal S2 is advantageously emitted in a wireless way from an assembly 33 containing the sensor 47. As the support 31 longitudinally move, distance signals are regularly emitted by the assembly 33 and allow determining the profile of the material 20 along the coke oven 10.

The system 15 will now be further described.

As shown in FIG. 1, the system 15 comprises the support 31, the assembly 33 fastened to the support, a wireless signals receiver 35 adapted to receive the distance signal S2 emitted by the assembly, and a computer 36.

As variant (not shown), if the material 20 is coke, the support 31 is a guide car.

Figure 2:
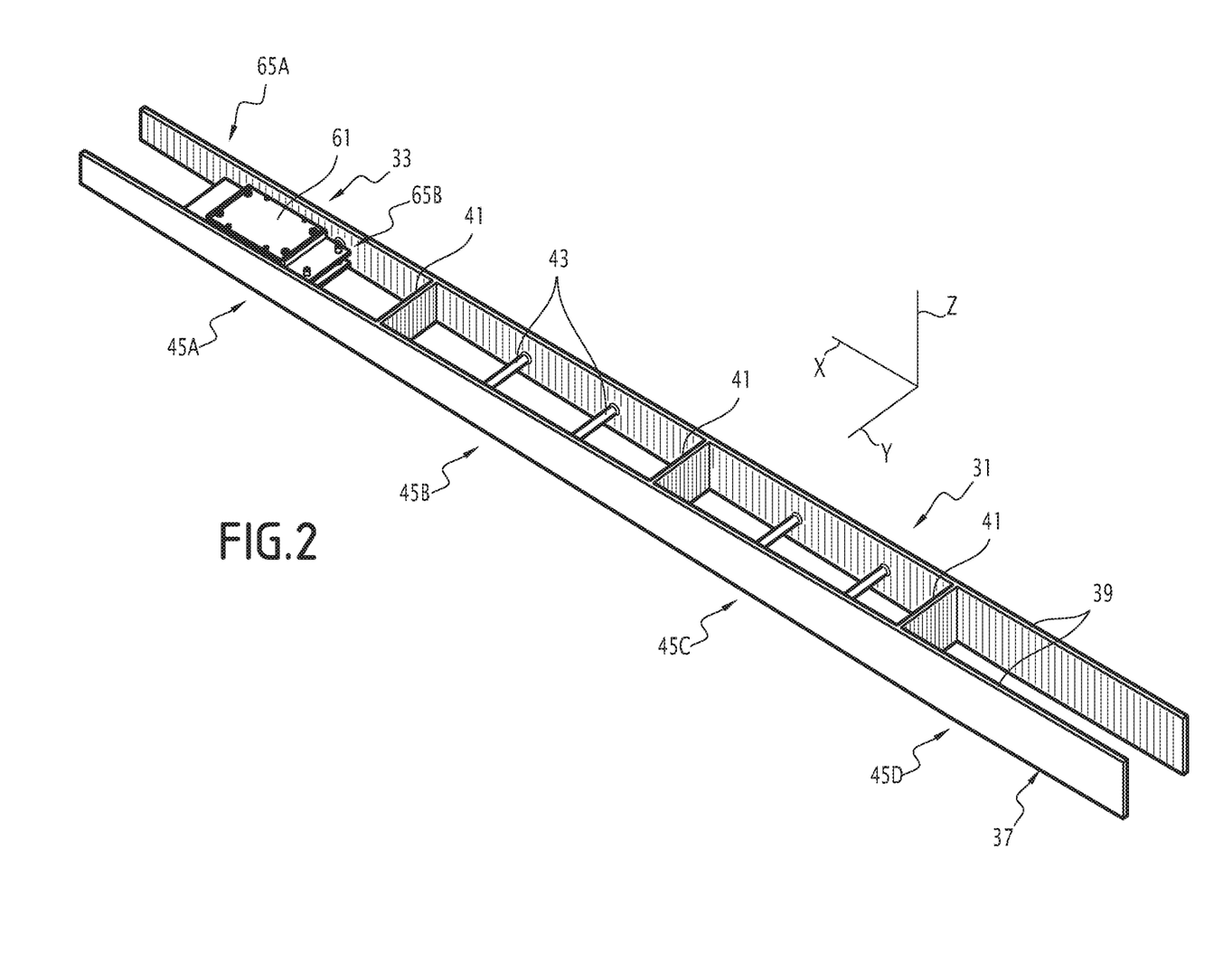
FIG. 2 is a schematic, perspective view of a levelling bar shown in FIG. 1.

As seen in FIGS. 1 and 2, the support 31 extends in the longitudinal direction X above the upper surface 29. The support 31 is for example longitudinally movable among a plurality of successive locations (not shown) with respect to the coke oven 10, so as to put the sensor 47 in the locations X1, X2 . . . XN.

The support 31 has a bottom part 37 (lowermost part). The support 31 for examples comprises two longitudinal beams 39 spaced apart along a transverse direction Y perpendicular to the longitudinal direction X, and spacers 41, 43 extending transversely between the longitudinal beams.

Each of the spacers 41 are for example flat and vertical. The spacers 41 defines successive compartments 45A, 45B, 45C, 45D in the support 31 along the longitudinal direction X.

The spacers 43 are made of a rod. The spacers 43 are advantageously located in a same horizontal plane P'.

Each of the compartments 45A, 45B, 45C for example has two spacers 43.

As seen in FIGS. 1 and 2, the assembly 33 is advantageously positioned at a longitudinal end of the support 31, preferably inside its structure, for example in the compartment 45A.

Figure 3:
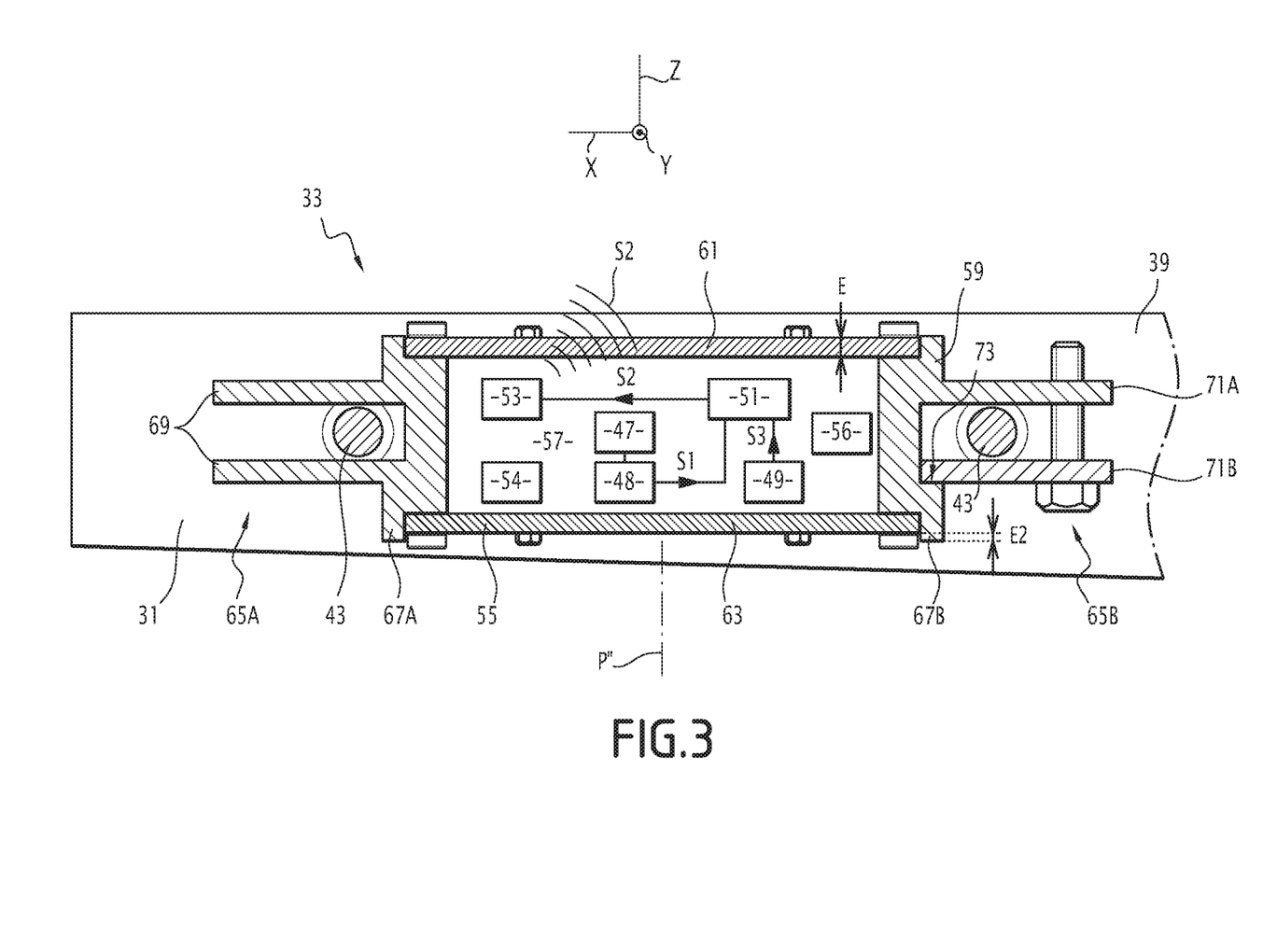
FIG. 3 is a side view of an assembly comprising a sensor and shown in FIGS. 1 and 2.

As best seen in FIG. 3, the assembly 33 comprises the sensor 47, the device 48 for providing the capacitance signal S1, a temperature sensor 49, a temperature compensation system 51 electrically connected to the device 48 and to the temperature sensor, and a wireless signals emitter 53 connected to the temperature compensation system and adapted to emit the distance signal S2.

The assembly 33 optionally comprises an accelerometer 56 adapted to provide parameters for inertial navigation, such as the accelerations of the assembly with respect to the oven along the longitudinal direction X, the transverse direction Y and the vertical direction Z.

The electronic components inside the assembly 33 receive power supply by means of, for example, an external wire (not represented). Preferably, the electronic components inside the assembly 33 receive power supply from a battery 54. The battery 54 is advantageously a rechargeable one which wireless receives power by, for example, induction and releases it as electricity to the other elements of the assembly 33.

The assembly 33 also includes a protective housing 55 hosting the above mentioned elements of the assembly, in particular the electronic components.

The sensor 47 is for example composed of one or two metallic plates. The sensor 47 is located vertically at a distance D3 (FIG. 1) above the bottom part 37 of the support 31, the distance D3 for example ranging between 100 mm and 350 mm, preferably between 100 mm and 150 mm.

The sensor 47 is adapted to form a capacitor together with the material 20. The capacitance of this capacitor 20-47 depends on the distance D2 between the plate(s) inside the sensor 47 and the upper surface 29 of the material 20.

The sensor 47 is intended to constitute a first "plate" of the capacitor 20-47, while the material 20 is intended to constitute a second "plate". The capacitance C of the capacitor is for example given by:

$$C = \varepsilon_r \varepsilon_0 A / D2, \text{ whereby:}$$

$\varepsilon_r$ is the relative permittivity of space between the sensor 47 and the material 20, $\varepsilon_0$ is the vacuum permittivity, A is a surface of the "plates", and D2 is the distance between the sensor 47 and the upper surface 29.

In practice, $\varepsilon_r = 1$, so that the product C times D2 is a constant.

The device 48 is adapted to measure the capacitance C in order to produce the capacitance signal S1. Such a device for measuring a capacitance is known in itself. The device 48 is for example electrically connected to the sensor 47. For example, the device 48 is adapted to measure a change in a resonance frequency of a tank circuit composed of a fixed inductor and the capacitor 20-47.

The temperature sensor 49, for example a thermocouple, is adapted to measure temperature in the close vicinity of the sensor 47 in order to produce a temperature signal S3 and to send it to the temperature compensation system 51.

The temperature compensation system 51 is adapted to correct the capacitance signal S1 provided by the sensor 47 using the temperature signal S3 in order to produce the distance signal S2.

The wireless signals emitter 53 advantageously communicates with the wireless signals receiver 35 using a wireless communication protocol, such as the ZigBee one.

Figure 4:
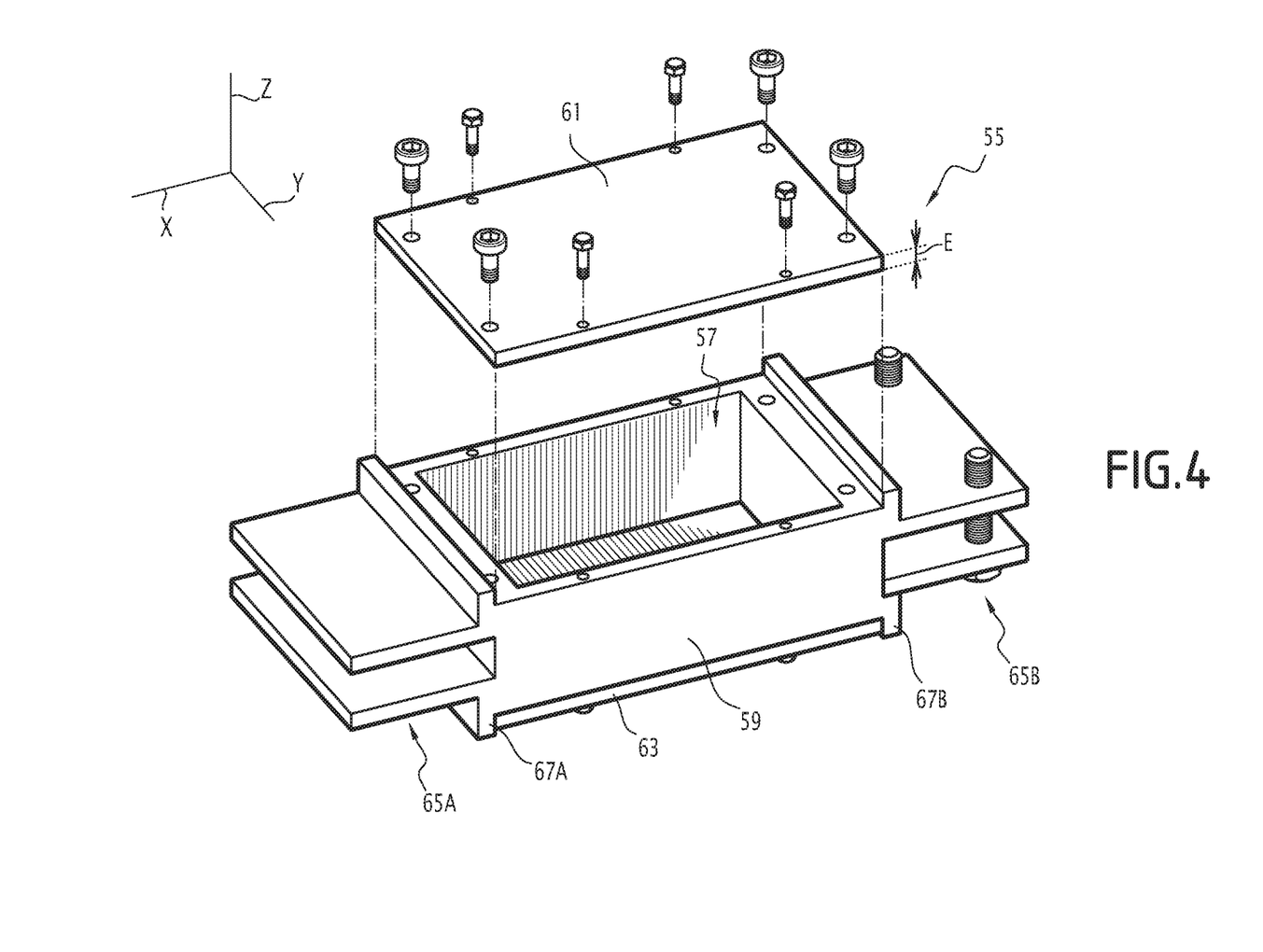
FIG. 4 is a perspective view of a protective housing within the assembly shown in FIGS. 1 to 3.

As seen in FIGS. 3 and 4, the protective housing 55 defines an internal chamber 57 protected from dust, fumes, moisture, high temperatures and heat fluxes in the coke oven 10. The protective housing 55 comprises a case 59 made of steel or any other robust material and extending along the longitudinal direction X and along the transverse direction Y, a cover plate 61, a bottom plate 63 opposite the cover plate along the vertical direction Z, and connection systems 65A, 65B respectively located on either sides of the case longitudinally.

The internal chamber 57 for example has a parallelepiped shape.

The case 59 includes approximately vertical walls delimiting the chamber 57. Advantageously, the case 59 also comprises at least one, preferably two, protective walls 67A, 67B.

The protective walls 67A, 67B are respectively located on both sides of the bottom plate 63 along the longitudinal direction X. The protective walls 67A, 67B are for example approximately perpendicular to the longitudinal direction X. The protective walls 67A, 67B protrude vertically and downwards from the bottom plate 63, advantageously along a height E2 (FIG. 3) of at least 5 mm.

The cover plate 61 and the bottom plate 63 are for example rectangular. The cover plate 61 and the bottom plate 63 are advantageously made of a high temperature resistant dielectric material, such as mica, and for example have a width E of at least 10 mm. The cover plate 61 and the bottom plate 63 are for example reversibly screwed on the case 59.

The cover plate 61 and the bottom plate 63 are advantageously sealed to the case 59 using a high temperature sealant, such as the Loctite® 596 red silicone, and a thread locker, such as the Loctite® 243 medium strength thread locker.

The connection system 65A is adapted to receive one of the spacers 43 between two parallel plates 69 fixed to the case 59 and advantageously approximately horizontal.

The connection system 65B is adapted to receive another of the spacers 43 between two parallel plates 71A, 71B, advantageously approximately horizontal.

The plate 71A is fixed to the case 59 and is for example symmetrical with one of the plates 69 with respect to a plane P''' perpendicular to the longitudinal direction X.

The plate 71B is movable between a blocking position shown in FIG. 3, wherein the plate 71B is fastened on the plate 71A and vertically abuts against the spacer 43 received in the connection system 65B and against an abutment 73 defined by the case 59, and a releasing position (not shown), wherein the plate 71B is not fastened to the plate 71A and wherein the assembly 33 can be moved with respect to said spacer 43.

For example, the signals S1, S2, S3 are a tension, a current intensity, a frequency dependent signal, or a wireless signal.

In the shown example, the support 31 is provided as a levelling bar of the coke oven 10. The assembly 33 is built and sealed outside of the coke oven 10 and then mounted on the support 31 (FIG. 2), preferably outside of the coke oven 10.

In order to mount the assembly 33 on the support 31, the assembly is moved with respect to the support so that one of the spacers 43 of the compartment 45A is introduced in between the plates 69 towards to case 59, the plate 71B being in its releasing position (FIG. 3). Then the assembly 33 is rotated around said spacer 43 with respect to the support 31, so that the plate 71A abuts against the other spacer 43. Finally the plate 71B is bolted to the plate 71B in the blocking position. As a result, the assembly is fixed to the support 31, with some clearance along the longitudinal direction X.

The support 31 is then installed in the chamber 25 (FIG. 1).

In another embodiment (not represented) the assembly 33 is fixed to a rail running along the chamber 25 and the assembly 33 is able to move along that rail.

In a further embodiment (not represented) the assembly is fixed to a movable support arm.

The sensor 47 and the other active components in the internal chamber 57 receive power from the battery 54. The device 48 provides the capacitance signal S1, for example a frequency signal dependent on the capacitance C.

The temperature sensor 49 measures the temperature within the internal chamber 57 as close as possible to the sensor 47 and provides the temperature signal S3 representative of the temperature conditions inside the coke oven 10.

The temperature compensation system 51 receives the capacitance signal S1 and the temperature signal S3. Based on the capacitance signal S1 and the signal S3, the temperature compensation system 51 produces the distance signal S2 which is not, or less, impacted by potential variations of the temperature in the internal chamber 57 than the capacitance signal S1.

Then the distance signal S2 is transferred to and emitted by the emitter 53 (FIG. 3). The distance signal S2 is received by the receiver 35 (FIG. 1) and then used, for example by the computer 36 in order to obtain the height H.

Tests

Tests of the system 15 have been performed in industrial conditions.

The assembly 33 was attached or detached quickly, in less than five minutes.

Thirteen coke ovens were equipped with the assembly 33 installed in the levelling bar. No operational problems were detected during normal operation of the coke ovens.

The assembly 33 was able to withstand industrial working conditions during 45 hours of trials, and after thirteen measurements it still worked well. The maximum temperature registered during the tests inside the assembly 33 was only about 105° C., so that the electronic components of the assembly were not affected by the trial.

There was no coal dust or gases entering the assembly 33.

Figure 5:
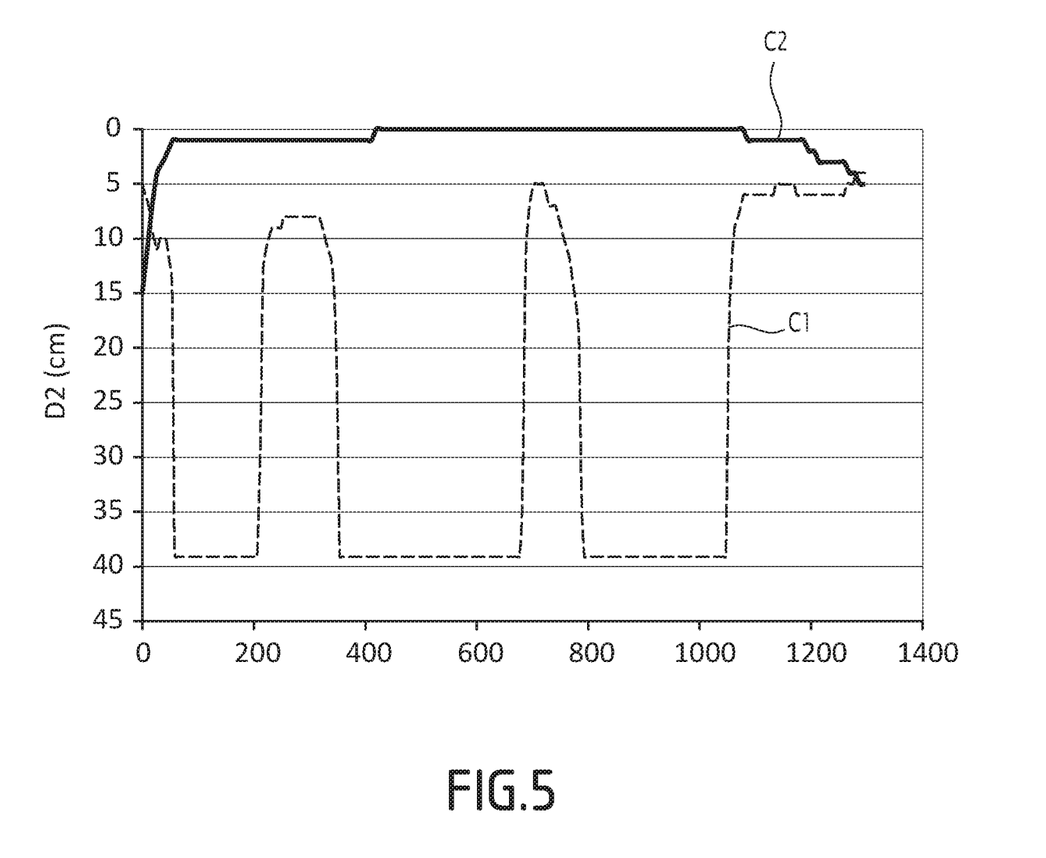
FIG. 5 is a diagram obtained in industrial conditions and showing a distance signal transmitted by the assembly versus the position of the sensor installed in the levelling bar while the levelling bar was moved with respect to bulk coal.

The graph in FIG. 5 shows two curves C1, C2 providing the distance D2 (FIG. 1) between the bulk coal surface and the sensor 47 (FIG. 3) along the vertical direction Z versus a longitudinal position of the sensor in the coke oven. Curves C1, C2 represent a longitudinal profile of the bulk coal surface.

Curve C1 was obtained after the first time the leveling bar entered in the coke oven, also named first stroke, and curve C2 when the leveling bar exited the coke oven during its last movement, also named last stroke.

Curve C1 illustrates that the distance H varies between 5-10 cm and approximately 40 cm. The distance H is smaller when the sensor is under the filling holes 27 (FIG. 1); whereas it is larger when the sensor is not.

After the last stroke, curve C2 proves that the bulk coal profile is approximately flat, showing that the filling is correct.

Assuming that transverse profiles of the bulk coal surface are approximately flat, a filling rate of the coke oven 10 is easily calculated based on curve C2 and knowing the coke oven width. Curve C2 shows that the filling rate is very close to 100%.

Thanks to the above features, the system 15 is adapted for use in a coke oven and accurately measures the height H. The system 15 increases productivity by ensuring proper filling of the coke oven 10. It also increases the safety of operators, as the filling holes 27 do not have to stay open.

The system 15 well withstands the aggressive environment inside a coke oven.

The system 15 also has a very short response time, which allows obtaining almost continuous measurement of the profile inside the coke oven 10.

The cost of the system 15 is lower than, for example, the cost of a microwave radar solution.

Another advantage is that the distance signal S2 is quite stable, as it includes a compensation system for temperature variations, and thanks to its low level of noise.

Another advantage is that the system 15 can work continuously, 24 hours a day, seven days a week, as it can be provided with wireless power supply to recharge the battery when, for example, the leveling bar is stopped outside the coke oven in its rest position.

Advantageously, the sensor 47 is carried by the support 31 itself.

What is claimed is:

1. A method for obtaining a parameter representative of a height of an upper surface of a material stacked in a coke oven with respect to a reference plane, comprising the following steps:
    providing a sensor located above the upper surface at an operation distance from the reference plane, the sensor and the material forming a capacitor having a capacitance,
    obtaining at least one capacitance signal representative of said capacitance,
    obtaining at least one distance signal using the capacitance signal, the distance signal being representative of a distance between the sensor and the upper surface along a vertical direction, and
    obtaining said parameter representative of the height using the distance signal and the operation distance.

2. The method according to claim 1, further comprising:
    measuring a parameter representative of a temperature of the sensor, and
    correcting the capacitance signal provided by the sensor in function of said parameter in order to produce the distance signal.

3. The method according to claim 1, wherein obtaining the capacitance signal includes selecting the operation distance so that the distance between the sensor and the upper surface ranges between 0 cm and 60 cm.

4. The method according to claim 1, further comprising:
    moving the sensor within the coke oven in a plurality of successive locations with respect to the upper surface,
    obtaining a plurality of distance signals, each of the distance signals being obtained in one of the successive locations, and
    obtaining a profile of the upper surface using the plurality of distance signals.

5. The method according to claim 4, further comprising a step of calculating a filling rate of the coke oven using the obtained profile, wherein the filling rate is representative of an amount of the material in the coke oven.

6. A process for controlling a filling rate of a coke oven, the process comprising:
    implementing the method according to claim 5 in to obtain the filling rate of the coke oven, and
    adjusting the amount of the material in the coke oven using the obtained filling rate.

7. A system for obtaining a parameter representative of a height of an upper surface of bulk coal stacked in a coke oven with respect to a reference plane, comprising:
    a leveling bar intended to be moved within the coke oven in a plurality of successive locations with respect to the upper surface, and
    at least one assembly fastened to the leveling bar and including:
        a sensor intended to be above the upper surface at an operation distance from the reference plane and to form a capacitor with the bulk coal, the capacitor having a capacitance, and
        a device for providing at least one capacitance signal representative of said capacitance, and
    a calculator,
    the assembly being suitable for providing at least one distance signal using the capacitance signal, the distance signal being representative of a distance between the sensor and the upper surface along a vertical direction,
    the calculator being adapted to calculate said parameter using the distance signal and the operation distance.

8. The system according to claim 7, wherein:
    the leveling bar has a bottom part, and
    the sensor is located vertically at a distance above the bottom part, said distance ranging between 100 mm and 350 mm.

9. The system according to claim 7, wherein the assembly further comprises a protective housing hosting the sensor, the protective housing being suitable for providing thermal insulation from a temperature comprised between 1000° C. and 1100° C. within the coke oven.

10. The system according to claim 9, wherein the protective housing comprises a case and at least one plate made of a dielectric material.

11. The system according to claim 7, wherein the assembly further includes:
    a temperature sensor adapted to measure a temperature in the assembly, and
    a temperature compensation system adapted to correct the capacitance signal provided by the sensor for variations of the measured temperature in order to produce the distance signal.

12. The system according to claim 7, wherein the assembly further includes an accelerometer adapted to provide parameters for inertial navigation of the assembly.

13. A coke oven comprising the system according to claim 7.

14. A system for obtaining a parameter representative of a height of an upper surface of coke stacked in a coke oven with respect to a reference plane, comprising:
    a guide car intended to be moved within the coke oven in a plurality of successive locations with respect to the upper surface, and
    at least one assembly fastened to the guide car and including:
        a sensor intended to be above the upper surface at an operation distance from the reference plane and to form a capacitor with the coke, the capacitor having a capacitance, and
        a device for providing at least one capacitance signal representative of said capacitance, and a calculator, the assembly being suitable for providing at least one distance signal using the capacitance signal, the distance signal being representative of a distance between the sensor and the upper surface along a vertical direction, the calculator being adapted to calculate said parameter using the distance signal and the operation distance.

15. A coke oven comprising the system according to claim 14.

* * * * *